United States Patent
Martin et al.

(10) Patent No.: US 8,050,831 B2
(45) Date of Patent: Nov. 1, 2011

(54) VEHICLE ENGINE SPEED CONTROL FOR A CONTINUOUSLY VARIABLE TRANSMISSION

(75) Inventors: Douglas Martin, Canton, MI (US); Edward Badillo, Brownstown Township, MI (US); John Shanahan, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 457 days.

(21) Appl. No.: 11/279,053

(22) Filed: Apr. 7, 2006

(65) Prior Publication Data

US 2007/0239339 A1  Oct. 11, 2007

(51) Int. Cl.
*G06F 17/00* (2006.01)
*G06F 7/00* (2006.01)

(52) U.S. Cl. ............... 701/54; 701/51; 701/53; 701/55; 701/56

(58) Field of Classification Search ............... 701/54
See application file for complete search history.

(56) References Cited

U.S. PATENT DOCUMENTS

| | | | |
|---|---|---|---|
| 6,019,698 A | 2/2000 | Lawrie et al. | |
| 6,220,987 B1 | 4/2001 | Robichhaux et al. | |
| 6,236,925 B1 | 5/2001 | Gierling et al. | |
| 6,244,986 B1 * | 6/2001 | Mori et al. | 477/46 |
| 6,746,366 B2 | 6/2004 | Tamor | |
| 6,823,954 B2 | 11/2004 | Shimabukuro et al. | |
| 2002/0063000 A1 * | 5/2002 | Kojima | 180/65.1 |
| 2005/0032598 A1 | 2/2005 | Hanyu et al. | |
| 2005/0080535 A1 * | 4/2005 | Steinmetz et al. | 701/51 |
| 2005/0080540 A1 | 4/2005 | Steinmetz et al. | |
| 2006/0137920 A1 * | 6/2006 | Aoki et al. | 180/65.2 |
| 2006/0162681 A1 * | 7/2006 | Kawasaki | 123/90.16 |

FOREIGN PATENT DOCUMENTS

| | | |
|---|---|---|
| AT | 310 5721 B | 10/1973 |
| DE | 103 57 443 A1 | 6/2004 |
| DE | 10 2004 002 813 A1 | 8/2005 |
| EP | 1 529 988 A2 | 5/2005 |
| EP | 1529988 A2 * | 5/2005 |
| EP | 1 555 156 A2 | 7/2005 |

OTHER PUBLICATIONS

Great Britain Examination Report dated Jun. 7, 2010 for Application No. GB0706712.7, pp. 1-2.

* cited by examiner

*Primary Examiner* — Khoi Tran
*Assistant Examiner* — Bao Long Nguyen
(74) *Attorney, Agent, or Firm* — David Kelley; Brooks Kushman P.C.

(57) ABSTRACT

A vehicle and a method for controlling a vehicle transmission is provided. The vehicle has at least one wheel and a positionable acceleration device. The vehicle includes an engine being responsive to the position of the acceleration device, wherein the engine provides torque to the wheel. In one embodiment, a transmission is coupled to the engine and the wheel, wherein the transmission provides multiple speed ratios and is configured to operate in a continuously variable mode. The vehicle also includes a controller that communicates with the engine and the transmission. The controller senses the position of the acceleration device, determine a shift schedule based on the position of the acceleration device, and set an engine speed limit for the engine. The controller also generates signals for the transmission to provide the speed ratio based on the engine speed limit while the transmission operates in the continuously variable mode.

17 Claims, 11 Drawing Sheets

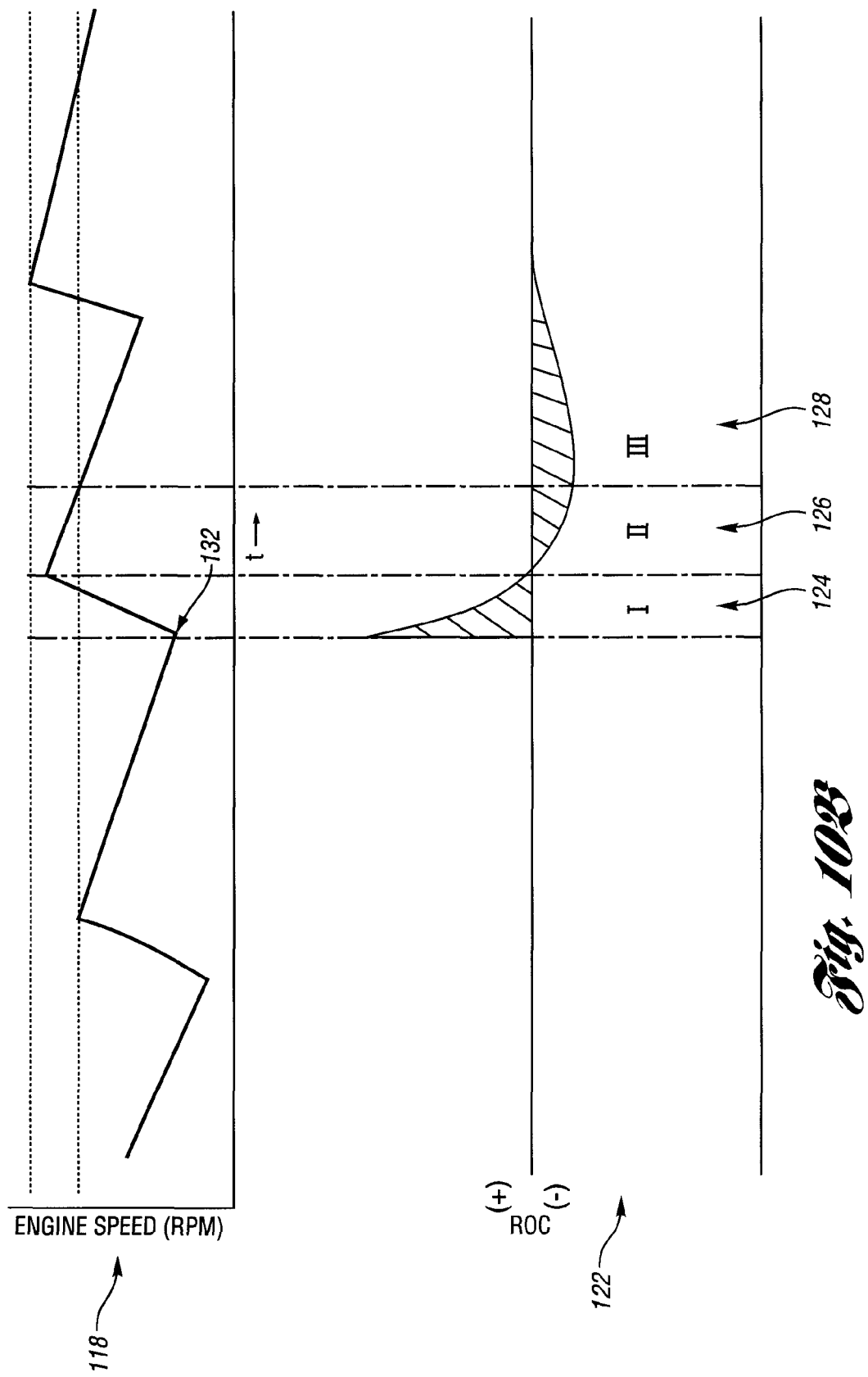

VEHICLE ENGINE SPEED CONTROL FOR A CONTINUOUSLY VARIABLE TRANSMISSION

TECHNICAL FIELD

The present invention relates to a system and method for controlling a transmission within a vehicle.

BACKGROUND

On vehicles having a conventional automatic transmission the engine speed (i.e., engine revolutions per minute (RPM)) typically adjusts proportionately with the vehicle speed. For example, as the vehicle accelerates, the engine RPM increases. Accordingly, as the vehicle decelerates, the engine RPM decreases. However, on vehicles having a continuously variable transmission (CVT), it is known that the engine may freely adjust from one engine speed to another, irrespective of the speed of the vehicle. Such engine speed variableness is unanticipated by vehicle occupants and hence undesirable.

The present invention was conceived in view of these and other disadvantages of vehicles having conventional CVT systems.

SUMMARY

The present invention provides a vehicle and a method for controlling a vehicle transmission. The vehicle has at least one wheel and a positionable acceleration device that is adapted to cause the vehicle to accelerate. The vehicle includes an engine being responsive to the position of the acceleration device, wherein the engine provides torque to the at least one wheel. In one embodiment, a transmission is coupled to the engine and the at least one wheel, wherein the transmission provides multiple speed ratios and is configured to operate in a continuously variable mode. The vehicle also includes a controller that communicates with the engine and the transmission. The controller is configured to sense the position of the acceleration device, determine a shift schedule based on the position of the acceleration device, and set an engine speed limit for the engine. The controller also generates signals for the transmission to provide at least one of the speed ratios based on the engine speed limit while the transmission is operating in the continuously variable mode.

The method of controlling the vehicle includes providing a transmission that provides multiple speed ratios, wherein the transmission operates in a continuously variable mode. The method also includes receiving an acceleration signal from an acceleration device, through the use of a controller, wherein the acceleration signal corresponds to the position of the acceleration device. The method further includes determining a shift schedule based on the acceleration signal and setting an engine speed limit that corresponds to the shift schedule. Additionally, the method includes generating signals for the transmission to provide at least one of the speed ratios based on the engine speed limit while the transmission is operating in the continuously variable mode.

BRIEF DESCRIPTION OF THE DRAWINGS

The features of the present invention which are believed to be novel are set forth with particularity in the appended claims. The present invention, both as to its organization and manner of operation, together with further objects and advantages thereof, may be best understood with reference to the following description, taken in connection with the accompanying drawings in which:

FIGS. 7A-7E illustrate various speed ratio upshifting graphs during various drive modes in accordance with embodiments of the present invention;

FIG. 10B illustrates multiple vehicle metrics versus time during various operating phases in accordance with yet another embodiment of the present invention.

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular proponents. Therefore, specific functional details disclosed herein are not to be interpreted as limiting, but merely as a representative basis for the claims and/or as a representative basis for teaching one skilled in the art to variously employ in the present invention.

Figure 1:
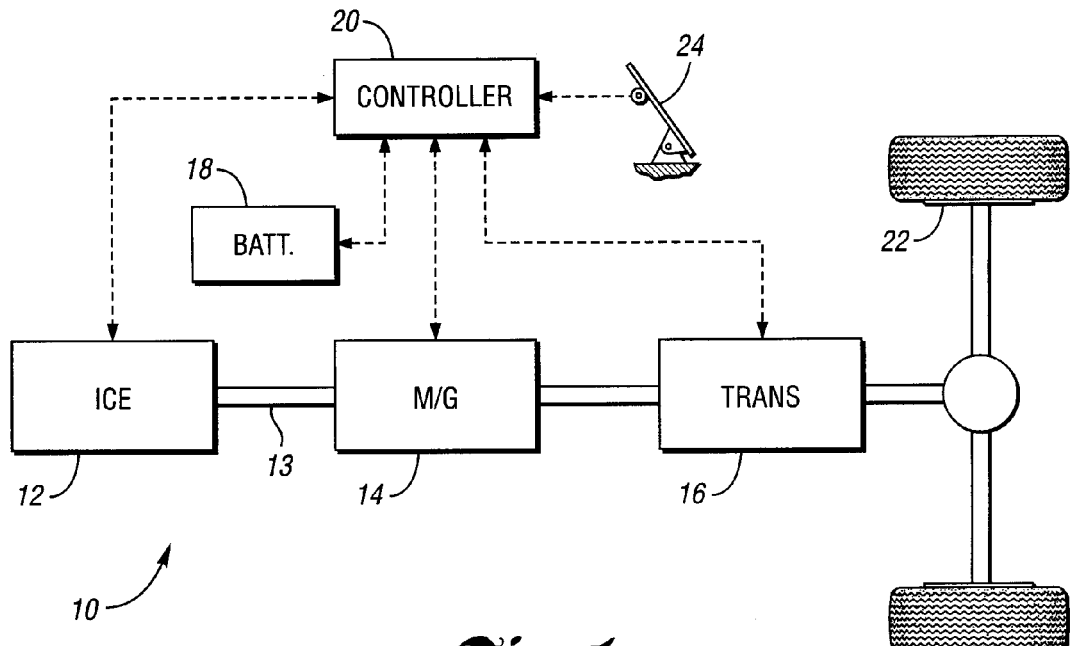
FIGS. 1 and 2 illustrate embodiments of a vehicle in accordance with the present invention.

Referring to FIG. 1, a schematic representation of a vehicle 10 is shown in accordance with one embodiment of the present invention. The vehicle 10 may be a hybrid electric vehicle (HEV) having an engine 12 and a motor/generator 14. The engine 12 and motor/generator 14 are mechanically coupled through the use of a shaft 13 in a known manner. Having the motor/generator 14 operatively connected to the engine 12, allows the speed of the engine 12 to be controlled by motor/generator 14. Engine 12 may be an internal combustion engine (ICE) that provides motive force to wheels 22 in response to an acceleration device 24. Acceleration device 24 may be a positionable accelerator pedal and the like, as recognized by one of ordinary skill in the art.

As described above, engine 12 is coupled to motor/generator 14. Additionally, motor/generator 14 is mechanically coupled to a transmission 16 in a known manner. Transmission 16 is coupled to wheels 22 and provides desired speed ratios during vehicle operation. Transmission 16 may be a continuously variable transmission (CVT) adapted to provide multiple speed ratios. In one embodiment, transmission 16 is configured to provide eight speed ratios. It is recognized, however, that transmission 16 may provide more or less speed ratios depending upon vehicle performance requirements. Additionally, transmission 16 may be any type of transmission capable of operating in a continuously variable mode. As such, transmission 16 may not include interlocking gears but may be a pulley-based CVT, a toroidal CVT, or a hydrostatic CVT.

Accordingly, a controller 20 is configured to receive and generate signals for transmission 16 and other components of vehicle 10. Particularly, when acceleration device 24 is positioned, a signal is generated for controller 20. In response, controller 20 generates signals for at least one of engine 12, motor/generator 14, a battery 18, and transmission 16. As such, controller 20 may be a combination vehicle system controller and powertrain control module (VSC/PCM). Additionally, although it is shown as a single hardware device, controller 20 may include multiple controllers in the form of multiple hardware devices, or multiple software controllers within one or more hardware devices.

In the embodiment shown in FIG. 1, motor/generator 14 may be used to output torque to wheels 22 via transmission 16. Alternatively, motor/generator 14 may output electrical power to a high voltage bus and to an energy storage device, or battery 18. Battery 18 may be a high voltage battery capable of outputting electrical power to operate motor/generator 14. Other types of energy storage devices and/or output devices may be used with vehicle 10. For example, a device such as a capacitor may be used, which, like a high voltage battery, is capable of both storing and outputting electrical energy. Alternatively, a device such as a fuel cell may be used in conjunction with a battery and/or capacitor to provide electrical power for vehicle 10. As will be described hereinafter, battery 18, of FIG. 1 enables enhanced performance by vehicle 10. Also, controller 20 monitors the state of charge (SOC) of battery 18 to enable optimal vehicle performance.

Figure 2:
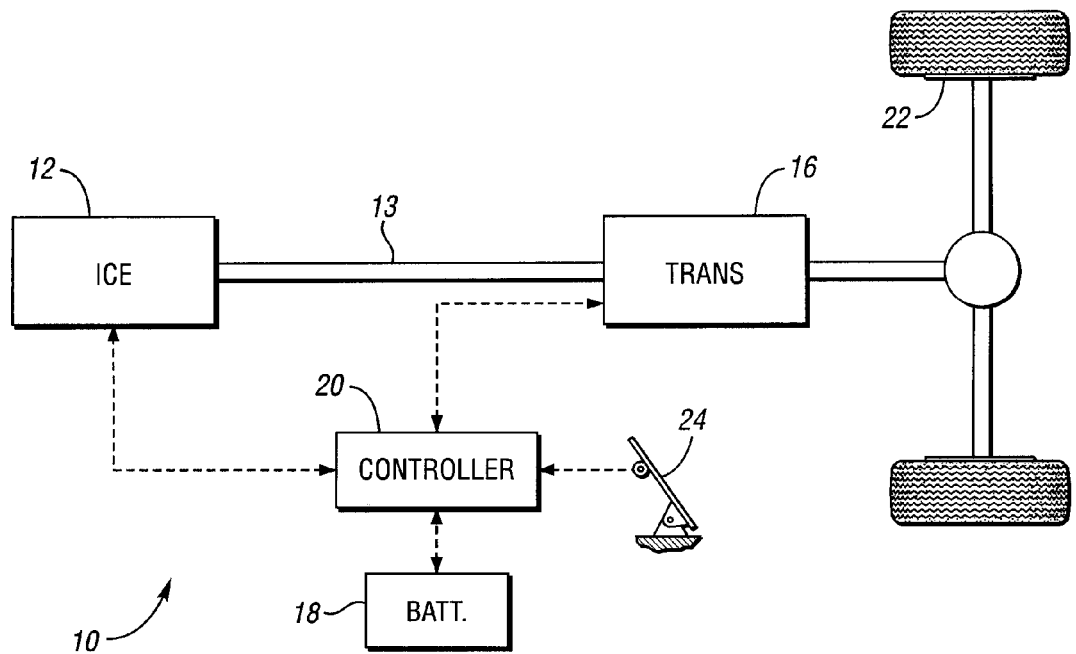

Although the embodiment shown in FIG. 1 illustrates a HEV, it is recognized that the present invention is equally applicable to non-HEVs. Accordingly, referring to FIG. 2, a non-HEV is illustrated. As shown in FIG. 2, vehicle 10 may include substantially the same components of FIG. 1 absent motor/generator 14.

Figure 3:
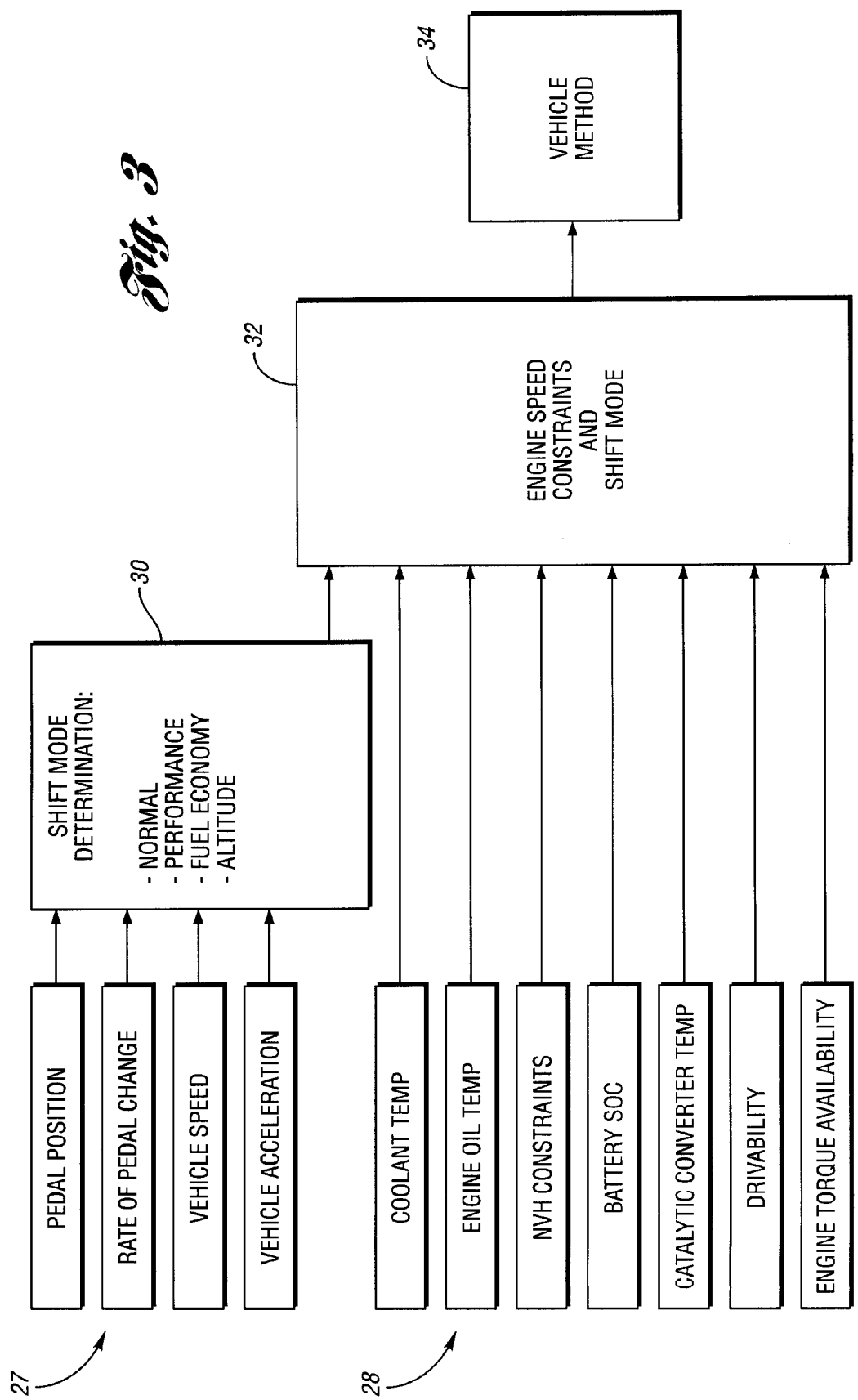
FIG. 3 is an exemplary block diagram which illustrates a flow diagram in accordance with embodiments of the present invention.

Referring to FIG. 3, a flow diagram is provided that illustrates a process for determining at least one vehicle operating method in accordance with the present invention. Accordingly, block 30 illustrates the determination of a shift mode via the controller 20 (FIGS. 1 and 2). In one embodiment, the shift modes include a normal, performance, fuel economy, and an altitude mode. The shift mode, in one aspect of the invention, corresponds to the manner in which the vehicle is being operated. For example, if a vehicle operator aggressively positions the accelerator device 24 (FIGS. 1 and 2), the corresponding shift made may be the performance mode. As such, in determining the shift mode, several inputs 27 are used. Inputs 27 may include signals that indicate the pedal position, a rate of pedal position change, vehicle speed, and vehicle acceleration. Block 32 illustrates the consideration of engine speed constraints that may affect a particular speed ratio as determined in accordance with the shift mode determination of block 30. Accordingly, various vehicle operational inputs 28 are received at block 32. These vehicle operational inputs include, but are not limited to, a coolant temperature input, an engine oil temperature input, noise, vibration, and harshness (NVH) constraints input, a battery state of charge (SOC) input, a catalytic converter temperature input, a drivability input, and an engine torque availability input. It is recognized that alternative embodiments may include some or all inputs 27 and 28 without departing from the scope of the present invention. Based on the engine speed constraints and determined shift mode at block 32, a vehicle method 34 may be implemented in accordance with the present invention.

Method 34 includes the determination of a shift schedule in accordance with blocks 30 and 32. In one embodiment, the shift schedule provides a particular time or moment in which the transmission should shift from one speed ratio to another. Based on the shift schedule, a target engine speed limit may be set. In one embodiment, once the target engine speed is set, the engine reaches the target engine speed in a relatively uncontrolled manner. Alternatively, the target engine speed may be set along with intermediate targets, thereby controlling the manner in which the target engine speed is reached by the engine.

Figure 4:
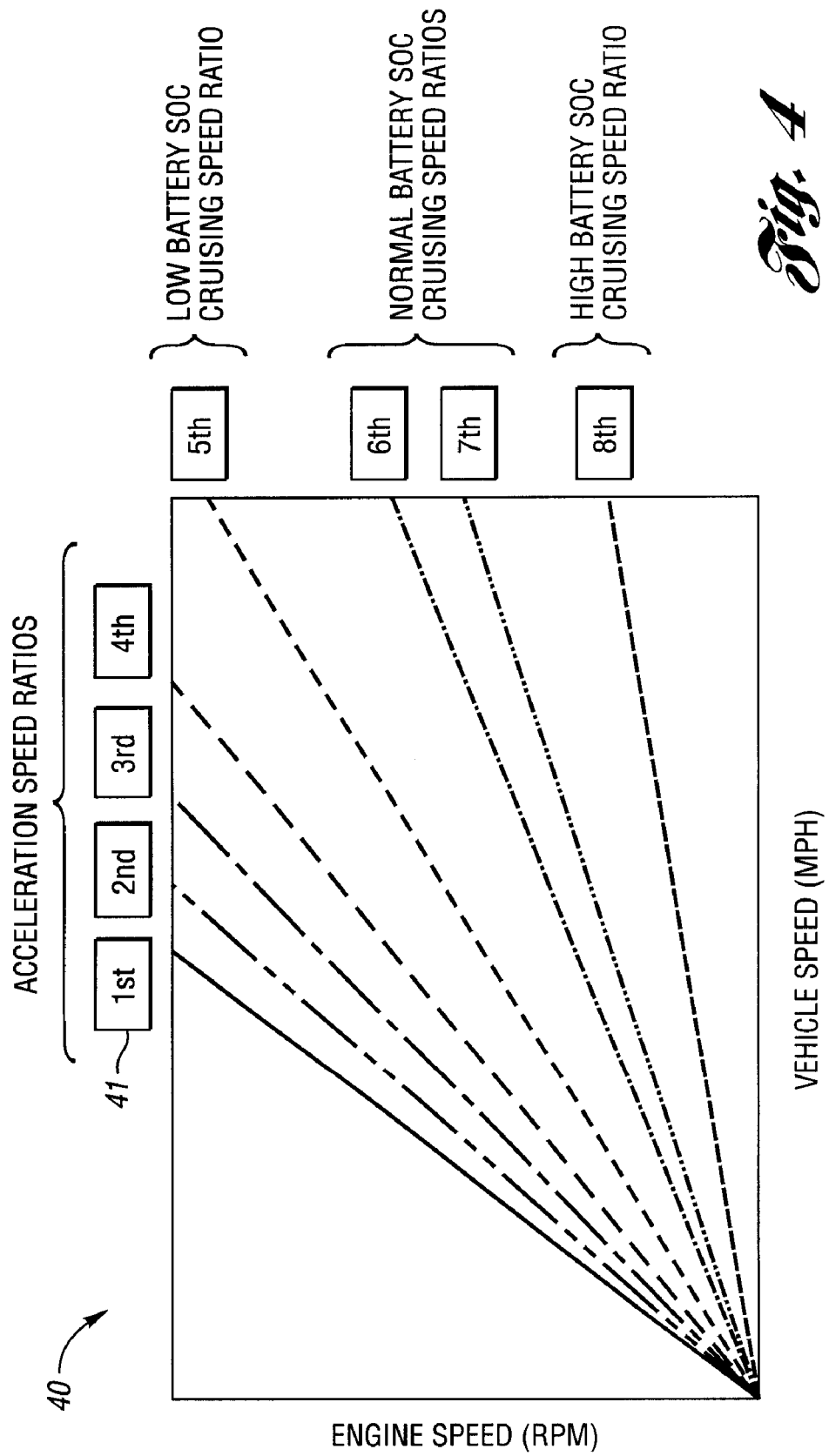
FIG. 4 illustrates a graph showing vehicle speed versus engine speed in accordance with an embodiment of the present invention.

Now, referring to FIG. 4, a graph 40 is illustrated showing vehicle speed versus engine speed in accordance with the method 34 of FIG. 3. As described above, the present invention may include a transmission capable of providing eight speed ratios (labeled 41). As indicated in FIG. 4, the first through fourth speed ratios may be speed ratios used during acceleration of the vehicle. As such, as the vehicle accelerates from one vehicle speed to another, the transmission (FIGS. 1 and 2) may provide speed ratios one through four. Additionally, a fifth speed ratio may be provided when a low battery state of charge exists while the vehicle is cruising at a particular vehicle speed. A sixth and seventh speed ratio may be provided when a nominal battery state of charge exists while the vehicle is cruising. Additionally, an eighth speed ratio may be provided when a high battery state of charge exists while the vehicle is cruising. It is recognized, however, that the provided speed ratio may differ from that illustrated in FIG. 4 in accordance with particular vehicle performance requirements without departing from the scope of the present invention.

Figure 5:
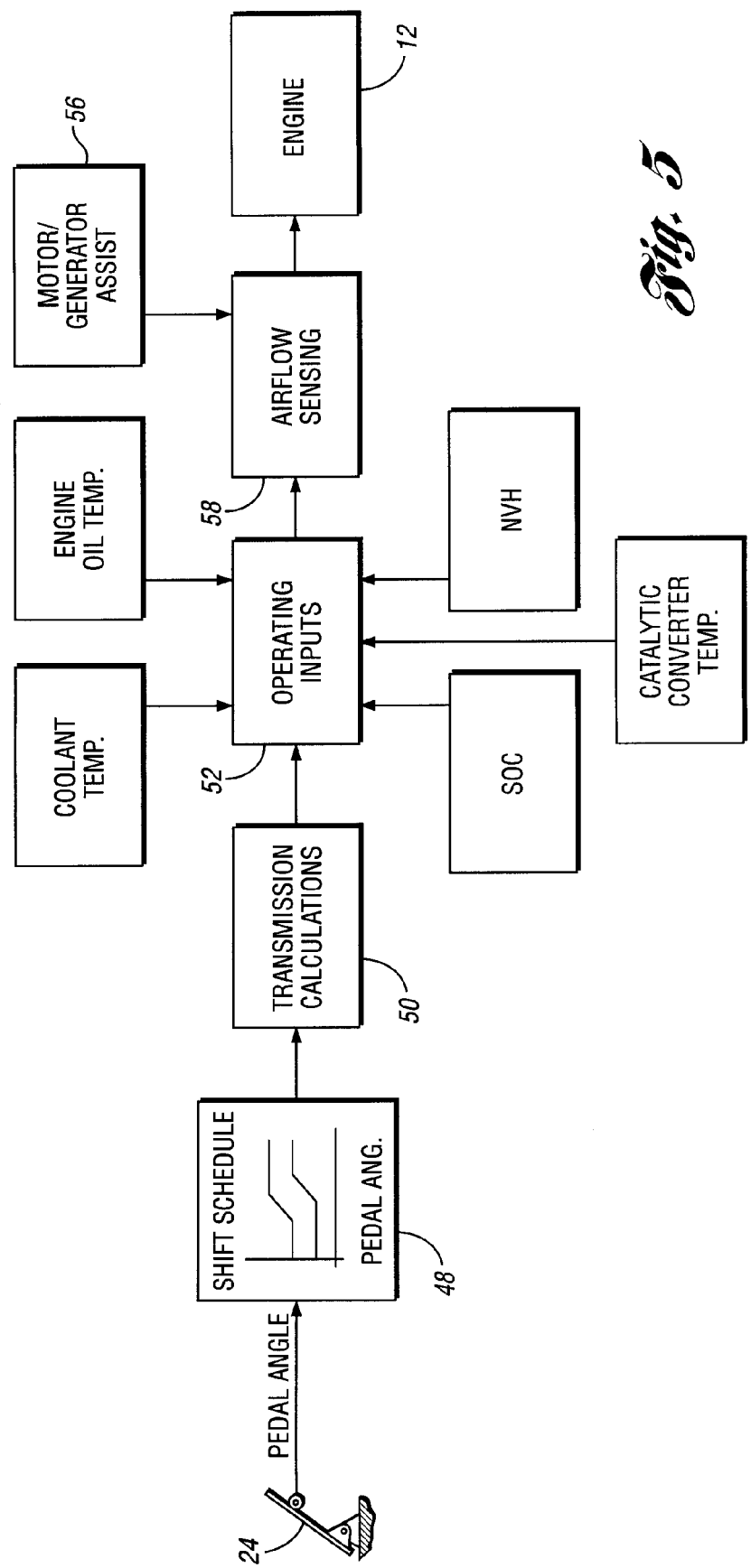
FIG. 5 illustrates a flow diagram for determining and executing a shift schedule in accordance with an embodiment of the present invention.

Referring to FIG. 5, a flow diagram illustrates the determination and execution of the shift schedule in accordance with the present invention. As described above, the acceleration device 24 (e.g., a pedal) generates a signal when positioned by the vehicle operator. Based on the pedal position or angle, a shift schedule is determined, as shown by block 48. At block 50, various transmission calculations occur. Particularly, at block 50, the transmission calculations may include factors such as the diameter of the vehicle's tires, the gear ratio of the vehicle's axle, and the like. Based on these calculations, an engine speed limit is determined, which corresponds to the shift schedule, as determined in block 48. In one aspect of the invention, the engine speed limit is an engine speed at which the transmission should change from one speed ratio to another.

At block 52, various operating inputs are considered that may affect the previously determined engine speed limit. These operating inputs may include a coolant temperature input, an engine oil temperature input, a battery state of charge (SOC) input, a catalytic converter temperature input, and a noise, vibration, and harshness (NVH) factor. In one embodiment, the NVH factor may be determined as a function of the engine's RPM. Based on these operating inputs, a second engine speed limit may be set if the controller determines that the initial engine speed limit/target is unacceptable. It is recognized, however, that alternative embodiments may not include the consideration of operating inputs, as illustrated at block 52. Nevertheless, block 58 illustrates the sensing of air flow through the vehicle engine. The present invention may sense the air flow to extract the amount of power that the engine is capable of providing in accordance with the engine speed limit. Accordingly, in the case of an HEV, the motor/generator provides torque assist to the vehicle if the engine is incapable of reaching the engine speed limit. It is recognized that alternative embodiments may include non-HEVs. Thus, block 56 may be excluded without departing from the scope of the present invention. Nevertheless, in either embodiment, the engine 12 receives a signal that causes the generation of torque that provides motive force to the wheels of the vehicle.

Figure 6:
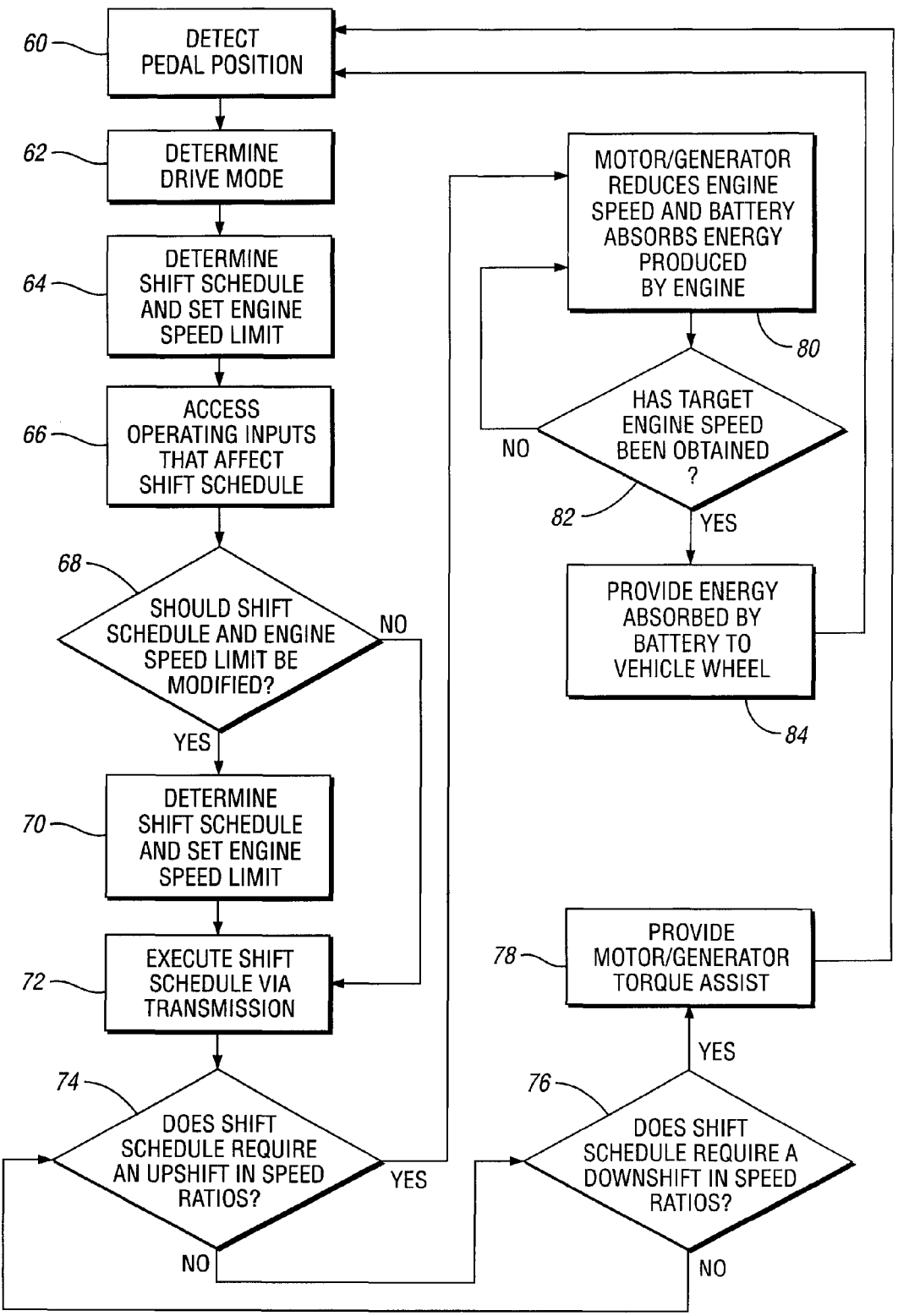
FIG. 6 illustrates a flow chart of a shifting algorithm in accordance with an embodiment of the present invention.

Referring to FIG. 6, a flow chart is illustrated showing an algorithm for controlling the transmission which is adapted to operate in a continuously variable mode. At a block 60, the pedal position is detected. Based on the pedal position, a drive mode is determined, as shown by block 62. At block 64, the shift schedule is determined and the engine speed limit is set in accordance with the pedal position and drive mode. Block 66 illustrates the assessment of operating inputs that may affect the shift schedule and engine speed limit. As described above, these operating inputs may include the coolant temperature, engine oil temperature, the SOC, the catalytic converter temperature, and a noise, vibration, and harshness (NVH) factor. Based on the assessment of the operating inputs, block 68 determines whether the shift schedule and engine speed limit should be modified. If the shift schedule and engine speed limit should be modified, a step 70 occurs wherein a second shift schedule and engine speed limit are determined. Block 72 illustrates the execution of the shift schedule via the transmission (FIGS. 1 and 2). Referring back to the block 68, if the shift schedule does not require modification, the block 72 occurs.

Now, at block 74, the algorithm determines whether the shift schedule requires an upshift in speed ratios. If an upshift in speed ratios is required, a block 80 occurs. At block 80, the motor/generator reduces the engine speed and the battery absorbs energy produced by the engine to enable the upshift in speed ratios. Following block 80, a block 82 occurs wherein the algorithm determines if the target engine speed limit has been obtained. If the target engine speed limit has not been obtained, the method returns to block 80. If the target engine speed limit has been obtained, a block 84 occurs. At block 84, the energy absorbed by the battery at block 80 is provided to the vehicle wheels via the motor/generator. Following block 84, the method returns to block 60.

Referring back to block 74, if the shift schedule does not require an upshift in speed ratios, a block 76 occurs. At block 76, the method determines whether the shift schedule requires a downshift in speed ratios. If the method does not require the downshift in speed ratios, the method returns to block 74. If a downshift in speed ratios is required according to the shift schedule, a block 78 occurs. At block 78, the motor/generator provides torque assist to the vehicle wheels. Accordingly, the method returns to block 60 following the execution of block 78.

Figure 7A:
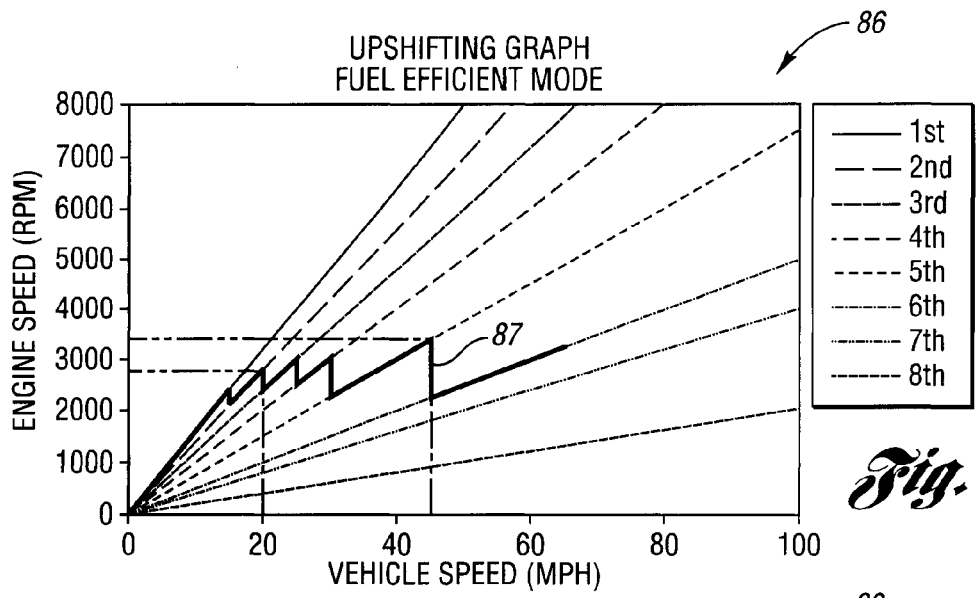
Figure 7B:
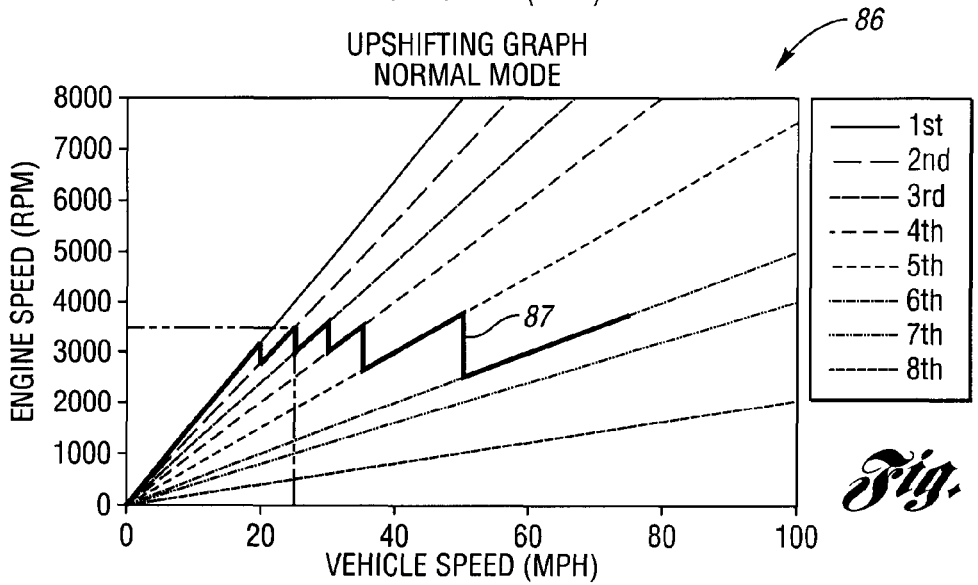
Figure 7C:
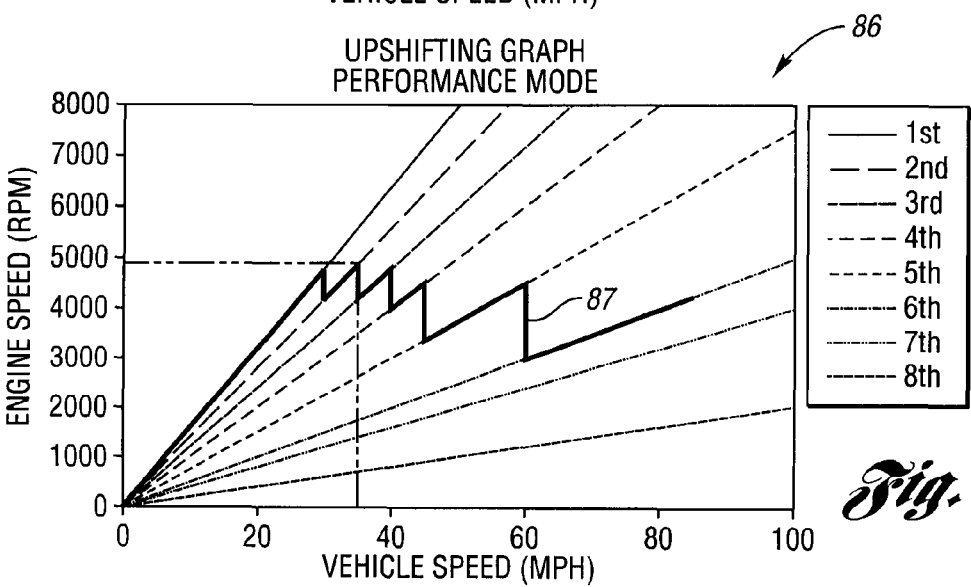
Figure 7B:
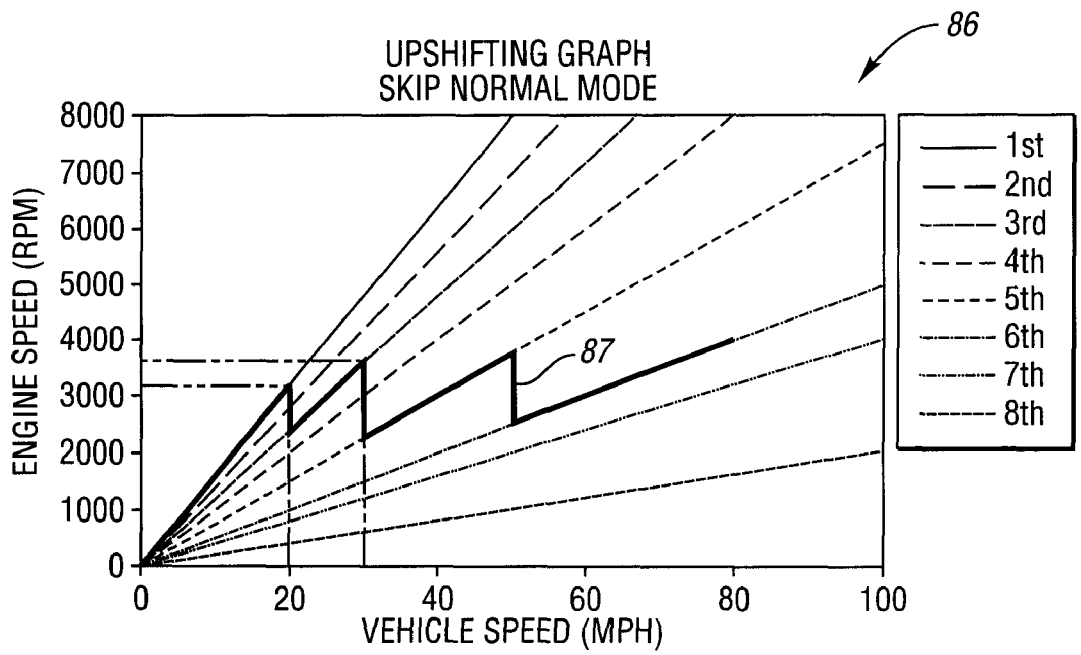
Figure 7C:
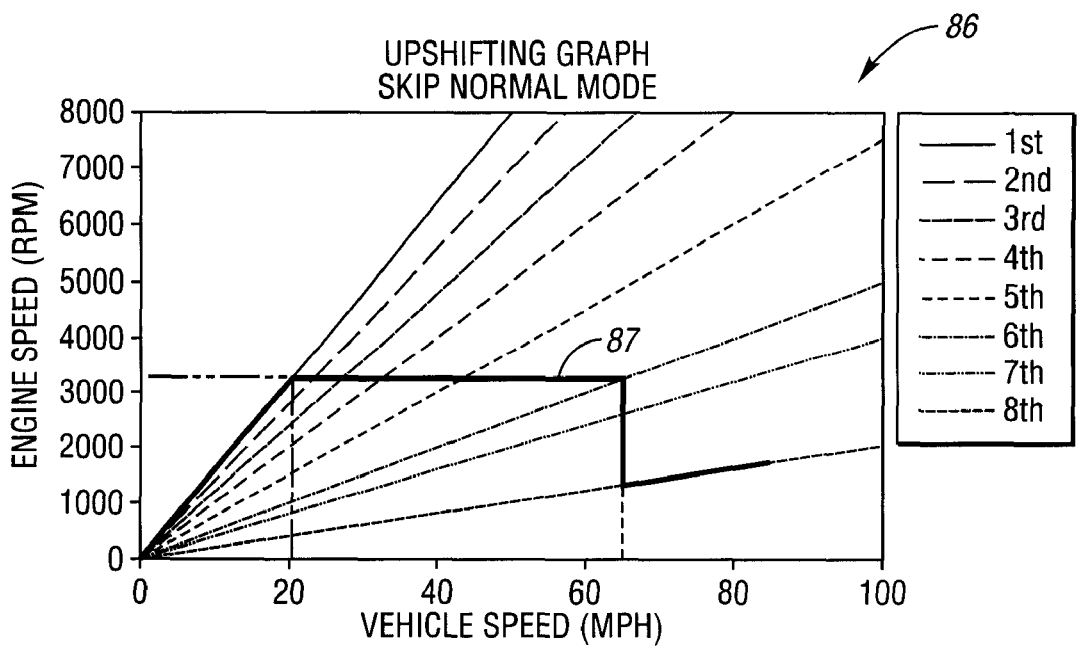

Now referring to FIGS. 7A-7E, various speed ratio upshifting graphs are illustrated. Particularly, referring to FIG. 7A, graph 86 illustrates a fuel efficient mode shift schedule. The line 87 indicates the shifting points according to the fuel efficient mode. For example, at 20 miles per hour, the engine speed is approximately 2900 revolutions per minute (rpm) as the transmission is in a second speed ratio. Additionally, at a vehicle speed of approximately 44 miles per hour and an engine speed of approximately 3400 rpm, the transmission provides the fifth speed ratio. FIG. 7B illustrates a normal mode. As shown, while in the second speed ratio, the vehicle speed is approximately 25 miles per hour and the engine speed is approximately 3500 rpm. FIG. 7C illustrates a performance mode. As such, while the transmission is in the second speed ratio, the vehicle speed is approximately 36 miles per hour and the engine speed is approximately 5000 rpm. FIGS. 7D and 7E illustrate a skip normal mode of operation. Specifically referring to FIG. 7D, the graph 86 shows that the transmission may provide speed ratios in a non-sequential manner. Specifically, line 87 indicates that an upshift occurs wherein the speed ratio adjusts from a first speed ratio to a third speed ratio. While in the first speed ratio, the vehicle speed may be 20 miles per hour and the engine speed may be 3300 rpm. Additionally, while in the third speed ratio, the vehicle speed may be 35 miles per hour and the engine speed may be 3700 rpm. FIG. 7E illustrates a scenario wherein the rpm (i.e., engine speed) remains constant across multiple speed ratios. Specifically, as indicated by line 87, at 20 miles per hour while in the first speed ratio the engine speed is approximately 3200 rpm. Between vehicle speeds 20 and 66 miles per hour, the rpm remains constant, although the speed ratio changes from the first speed ratio to the sixth speed ratio. At about 65 miles per hour, the speed ratio adjusts from the sixth speed ratio to the eighth speed ratio. Accordingly, as illustrated in FIGS. 7A-7E, the transmission speed ratios may be controlled while operating in a continuously variable mode. Additionally, it is recognized that the specific shift points as shown in FIGS. 7A-7E may be modified in accordance with a particular implementation without departing from the scope of the present invention.

Figure 8:
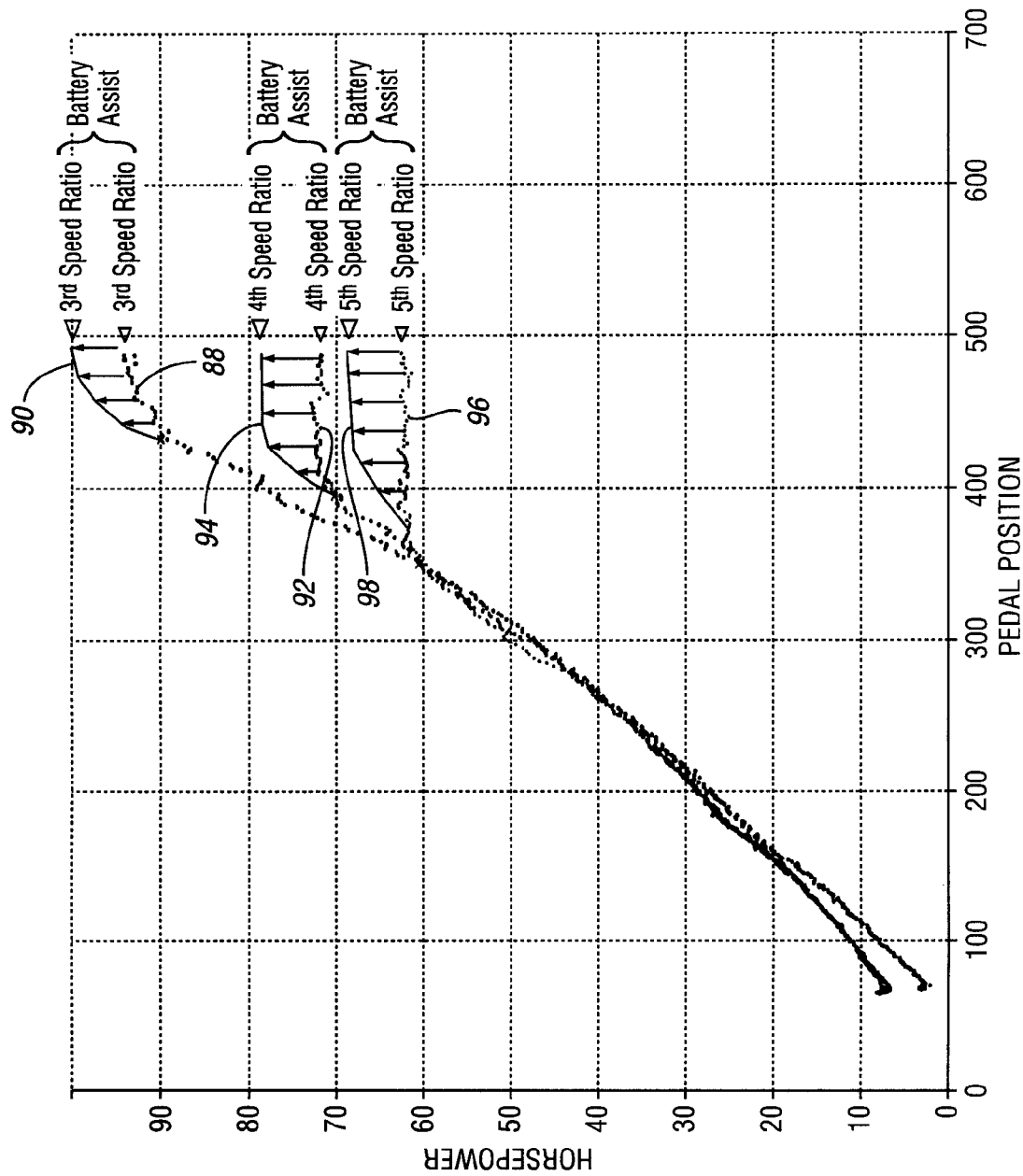
FIG. 8 illustrates an exemplary graph showing pedal position versus horsepower in accordance with an embodiment of the present invention.

Now referring to FIG. 8, a graph is shown illustrating pedal position versus horsepower. Particularly, the traces 88, 92, and 96 illustrate the torque produced on a non-HEV. Accordingly, traces 90, 94, and 98 illustrate the amount of torque produced as a result of battery assist provided on an HEV. As illustrated, the battery assist enables greater horsepower at different speed ratios as compared with non-HEVs. For example, as indicated by trace 96, the horsepower generated by a non-HEV is approximately 63, as compared to a horsepower of about 67 on an HEV. The battery assist also enables the vehicle to provide increased tractive effort with the respective speed ratio without having to change a lower speed ratio.

Figure 9:
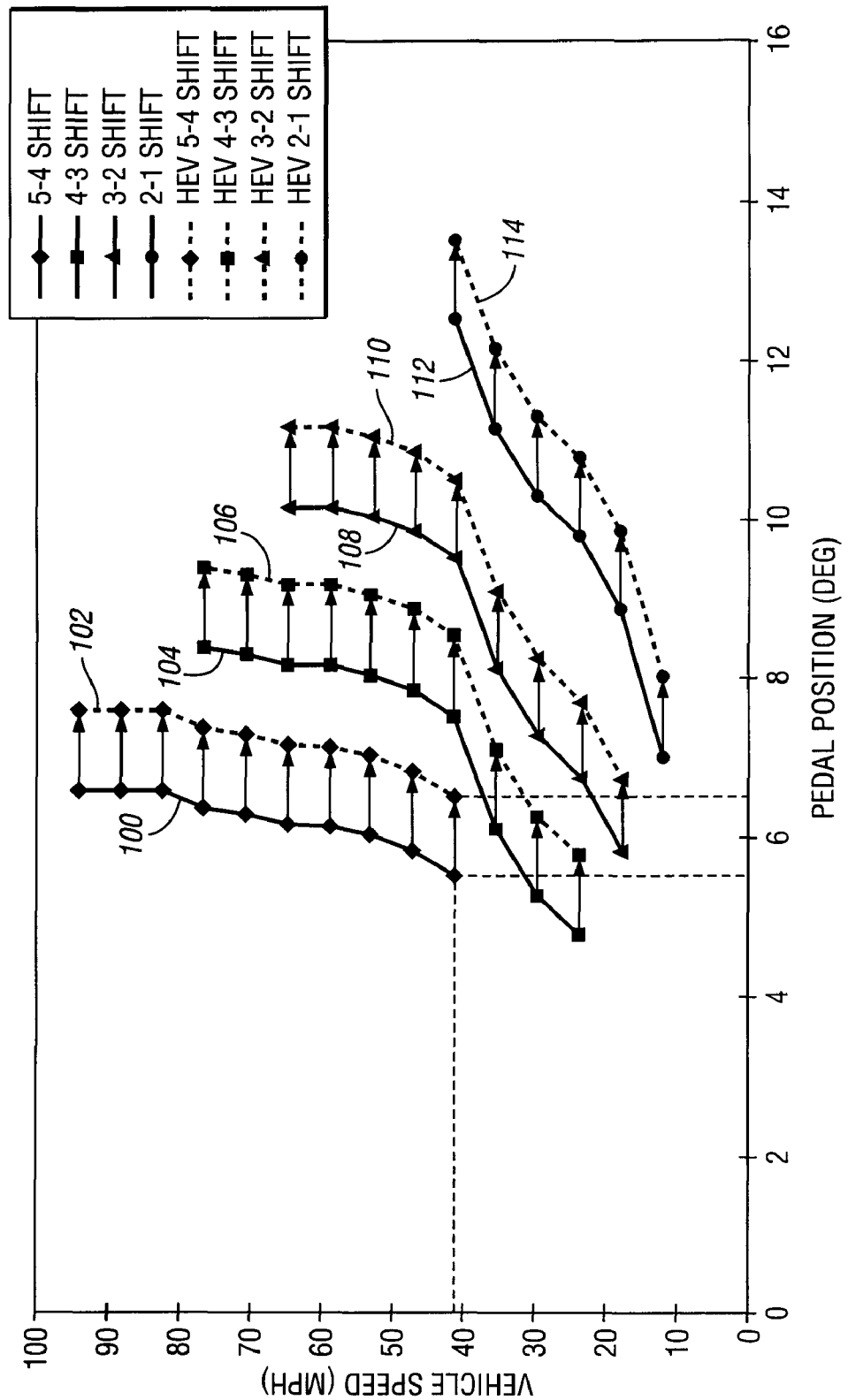
FIG. 9 illustrates a graph showing pedal position versus vehicle speed in accordance with an embodiment of the present invention.

Now, referring to FIG. 9, a shift schedule is illustrated showing pedal position in degrees versus vehicle speed. The lines 100, 104, 108, and 112 illustrate the shift schedule for non-HEVs. Lines 102, 106, 110, and 114 illustrate a shift schedule for HEVs. As such, the affect of battery assist on HEVs enables a later downshift (i.e., from the fifth speed ratio to the fourth speed ratio) as compared to non-HEVs. For example, with non-HEVs, a downshift from a fifth speed ratio to a fourth speed ratio occurs at approximately 42 miles per hour when a pedal position of about 5.7 degrees exists. Alternatively, with an HEV, a downshift from a fifth speed ratio to a fourth speed ratio occurs at approximately 42 miles per hour and a pedal position of about 6.6 degrees.

Figure 10A:
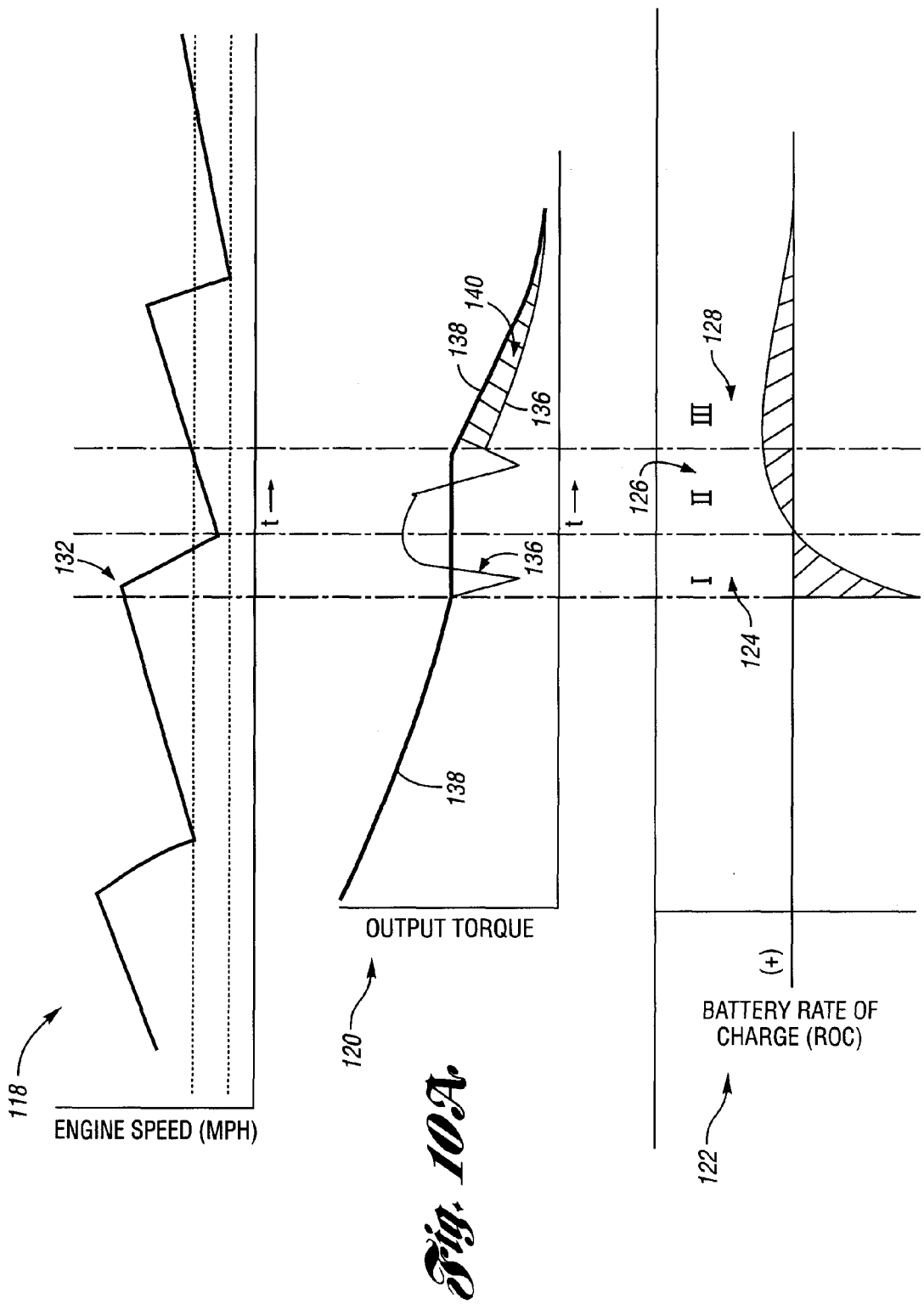
FIG. 10A illustrates multiple vehicle operating metrics versus time during various phases in accordance with an embodiment of the present invention.

Now referring to FIG. 10A, multiple graphs 118, 120, and 122 are illustrated during specific phases of vehicle operation. Particularly, graph 118 illustrates engine speed versus time, graph 120 illustrates output torque versus time, and graph 122 illustrates battery rate of charge versus time. As shown in FIG. 10A, the time access is divided into three phases. A first phase is labeled 124, a second phase is labeled 126, and a third phase is labeled 128. Specifically referring to graph 118, engine speed is shown versus time. A shift point 132 indicates a transition from a lower speed ratio to a higher speed ratio (e.g., from a first speed ratio to a second speed ratio) during phase 1. Graph 120 illustrates the output torque, as indicated by line 138, for an HEV. Line 136 illustrates the output torque for non-HEVs. As shown during phases 1 and 2 on graph 120, the output torque for HEVs remains substantially constant. However, with step-ratio automatic transmissions, as indicated by line 136, the output torque experiences significant fluctuations. Thus, the output torque for HEVs in accordance with the present invention remains substantially constant during speed ratio changes. During phase 3, the output torque for HEVs, as indicated by line 138, begins to taper off, as does the output torque for non-HEVs. However, as indicated by the area 140 between lines 136 and 138, the HEV output torque is greater than the output torque of non-HEVs. It is recognized that the tapering of the output torque in phase 3 with HEVs may be controlled so as to cause the line 138 to indicate a higher output torque or lower output torque as a result of battery assist. Now, referring to graph 122, during phase 1, the energy produced by the engine is absorbed by the battery. During phases 2 and 3, the battery supplies power to the motor/generator, thereby enabling the motor/generator to provide torque to the vehicle wheels.

FIG. 10B illustrates an alternative embodiment of FIG. 10A, wherein a downshift in speed ratios is illustrated. In this embodiment, the graph 122 illustrates the supply of power to the motor/generator to enable the motor/generator to pull up the engine speed. Additionally, phases 2 and 3 illustrate the battery absorbing energy from the engine so as to charge the battery to enable enhanced torque control for drivability.

While the best mode for carrying out the invention has been described in detail, those familiar with the art to which this invention relates will recognize various alternative designs and embodiments for practicing the invention as defined by the following claims.

What is claimed:

1. A vehicle having at least one wheel and a positionable acceleration device adapted to cause the vehicle to accelerate, the vehicle comprising:
   an engine being responsive to the position of the acceleration device, wherein the engine provides torque to the at least one wheel;
   a transmission coupled to the engine and the at least one wheel, the transmission providing multiple speed ratios and configured to operate in a continuously variable mode; and
   a controller that communicates with the engine, the transmission, and the acceleration device, the controller sensing the position of the acceleration device, selecting a drive mode based on the position of the acceleration device, the drive mode corresponding to the manner in which the vehicle is being operated, determining a shift schedule based on the position of the acceleration device and the selected drive mode, setting an engine speed limit for the engine based on the shift schedule and current vehicle speed, and generating signals for the transmission to achieve at least one of the speed ratios based on the engine speed limit while the transmission is operating in the continuously variable mode, the controller receiving at least one vehicle operating signal, determining a second shift schedule based on the position of the acceleration device, the selected drive mode, and the at least one vehicle operating signal, and setting a second engine speed limit based on the second shift schedule and the current vehicle speed while the vehicle continues to operate in the selected drive mode.

2. The vehicle of claim 1, wherein the controller generates signals for the transmission to achieve at least one of the speed ratios based on the second engine speed limit while the transmission is operating in the continuously variable mode.

3. The vehicle of claim 2, wherein the vehicle operating signal includes at least one signal corresponding to a coolant temperature, an engine oil temperature, a battery state of charge, a catalytic converter temperature, and a noise, vibration, and harshness (NVH) factor.

4. The vehicle of claim 2, further comprising a motor/generator that is coupled to the transmission and is communicative with the controller, the motor/generator providing torque to the at least one wheel to enable the engine to achieve the second engine speed limit.

5. The vehicle of claim 4, wherein the motor/generator provides torque to the at least one wheel to achieve the second engine speed limit when the second engine speed limit requires a downshift in speed ratios by the transmission.

6. The vehicle of claim 4, wherein the controller senses an air flow of the engine and generates a signal for the motor/generator to provide torque to the at least one wheel based upon the second engine speed limit and the air flow.

7. The vehicle of claim 4, further comprising a battery coupled to the motor/generator, the battery providing power to the motor/generator.

8. The vehicle of claim 7, wherein the motor/generator causes a reduction in engine speed and the battery absorbs energy produced by the engine when the second engine speed limit requires an upshift in speed ratios by the transmission.

9. The vehicle of claim 8, wherein the energy absorbed by the battery is provided to the at least one wheel once the second engine speed limit is reached, thereby providing a substantially constant wheel torque to the at least one wheel during the speed ratio upshift.

10. The vehicle of claim 1, wherein the transmission is a continuously variable transmission (CVT).

11. The vehicle of claim 1, wherein the transmission is adapted to achieve at least eight speed ratios.

12. The vehicle claim 11, further comprising a battery, wherein a fifth speed ratio is obtained when the battery has a low state of charge, a sixth or seventh speed ratio is obtained when the battery has a nominal state of charge, and an eighth speed ratio is obtained when the battery has a high state of charge.

13. The vehicle of claim 11, wherein a first through a fourth speed ratio is obtained during an acceleration phase of the vehicle.

14. A vehicle having at least one wheel and a positionable acceleration device adapted to cause the vehicle to accelerate, the vehicle comprising:
   an engine being responsive to the position of the acceleration device, wherein the engine provides torque to the at least one wheel;
   a transmission coupled to the engine and the at least one wheel, the transmission providing multiple speed ratios and configured to operate in a continuously variable mode;
   a controller that communicates with the engine, the transmission, and the acceleration device, the controller sensing the position of the acceleration device, selecting a shift schedule based on the position of the acceleration device and a drive mode selected according to the manner in which the vehicle is being operated, setting an engine speed limit for the engine that is derived from the shift schedule based on current vehicle speed, and generating signals for the transmission to achieve at least one of the speed ratios based on the engine speed limit while the transmission is operating in the continuously variable mode, the controller further receiving at least one vehicle operating signal for setting a second engine speed limit based on a second shift schedule associated with the selected drive mode and said current vehicle speed; and a motor/generator that is coupled to the transmission and is communicative with the controller, the motor/generator providing torque to the at least one wheel to enable the engine to achieve the second engine speed limit while the vehicle continues to operate in the selected drive mode.

15. The vehicle of claim 14, wherein the controller selects the drive mode based at least in part on the position of the acceleration device.

16. The vehicle of claim 14, wherein the motor/generator provides torque to the at least one wheel to achieve the second engine speed limit when the second engine speed limit requires a downshift in speed ratios by the transmission.

17. The vehicle of claim 14, further comprising a battery coupled to the motor/generator, wherein the motor/generator reduces the engine speed and the battery absorbs energy produced by the engine when the second engine speed limit requires an upshift in speed ratios by the transmission.

* * * * *